(12) United States Patent
Waskie et al.

(10) Patent No.: US 9,409,608 B2
(45) Date of Patent: Aug. 9, 2016

(54) PICKUP BOX EXTENDER WITH ACCESS DOORS

(71) Applicant: GM Global Technology Operations LLC, Detroit, MI (US)

(72) Inventors: David B. Waskie, Shelby Township, MI (US); Edward L. Schulte, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/595,812

(22) Filed: Jan. 13, 2015

(65) Prior Publication Data

US 2016/0200373 A1    Jul. 14, 2016

(51) Int. Cl.
*B60P 3/00* (2006.01)
*B62D 33/027* (2006.01)
*B60P 3/40* (2006.01)

(52) U.S. Cl.
CPC .............. *B62D 33/0273* (2013.01); *B60P 3/40* (2013.01)

(58) Field of Classification Search
CPC ............................ B62D 33/0273; B60P 3/40
USPC ....................................................... 296/26.11
See application file for complete search history.

(56) References Cited

U.S. PATENT DOCUMENTS

| 7,111,886 | B1* | 9/2006 | Miller | B60P 3/40 |
| | | | | 296/26.11 |
| 2002/0153737 | A1* | 10/2002 | Fitts | B60P 3/40 |
| | | | | 396/26.11 |
| 2012/0228893 | A1* | 9/2012 | Lu | B62D 33/0273 |
| | | | | 296/26.11 |

* cited by examiner

*Primary Examiner* — Joseph D Pape
(74) *Attorney, Agent, or Firm* — BrooksGroup

(57) ABSTRACT

The disclosure describes a box extender for a pickup truck that has a box with a bed and a tailgate, where the tailgate extends the bed's length in a longitudinal direction when open. The box extender may have access doors. First and second side walls may be mounted to the box to pivot between a forward, stowed position along opposite walls of the box and a rearward, extended position above the tailgate. An end wall may be disposed above the tailgate between the first and second side walls and may include a first section that is hinged to the first side wall and a second section that is hinged to the second side wall. The side walls and the end wall may enclose a volume above the tailgate for cargo storage. The first and second sections of the end wall may be opened to access the box.

21 Claims, 5 Drawing Sheets

PICKUP BOX EXTENDER WITH ACCESS DOORS

TECHNICAL FIELD

The field to which the disclosure generally relates includes cargo management and more particularly, to extending the cargo area of a pickup truck.

BACKGROUND

Pickup trucks may include a cargo box that may have three sides defined by the structure of the vehicle and a fourth side at the back of the vehicle that is typically provided as tailgate. The tailgate is usually hinged at its lower edge so that it opens by pivoting out and down to a horizontal orientation. When closed, the tailgate, the box bed, and other three sides of the box define a cargo area with a fixed volume. When the tailgate is open, it presents a horizontal surface that extends off the back of the bed, but leaves the back of the box volume open, and so is generally not useable for carrying unsecured cargo.

SUMMARY OF ILLUSTRATIVE VARIATIONS

An illustrative variation may be summarized as a box extender with access doors for a pickup truck. The pickup truck may have a cargo box defined by opposing longitudinal walls and a lateral wall, with an opening defined between the longitudinal walls opposite the lateral wall. The box extender may include a first side wall mounted to the box adjacent to one of the opposing longitudinal walls and a second side wall mounted to the box adjacent to the other of the opposing longitudinal walls. The first and second side walls may be configured to translate between a forward position adjacent the opposite longitudinal walls, and a rearward position extending rearward beyond the longitudinal walls. An end wall may be extendable between the first and second side walls wherein at least a portion of the first side wall, the second side wall, and the end wall may be opened to access the box.

A number of other variations may include a product for extending the cargo area of a box of a pickup truck. A first panel may have a first edge and a second edge. The first and second edges may be on opposite ends of the first panel. The first edge may be pivotably attached to the box. A second panel may be connected to the second edge. The first and second panels may be configured to be oriented inside of the box adjacent a wall of the box in a stored position with the second panel positioned against the first panel. The first and second panels may be configured to extend the box when positioned in an extended position outside of the box with the first panel rotated in a rearward direction on the pivot and the second panel rotated on the hinge so that the second panel is positioned at an angle to the first panel.

Still other variations may include an extender for a pickup having a cargo box with a first side and an opposite second side. The extender may include a first panel. A first pivot may attach the first panel to the first side of the box. A second panel may be hinged on the first panel. A third panel may include a second pivot attaching the third panel to the second side of the box. A fourth panel may be hinged on the third panel. The first, second, third and fourth panels may be configured to be stored adjacent the first and second sides of the box in a stored position. In the stored position the second panel may be rotated against the first panel, the fourth panel may be rotated against the third panel, the first panel may be rotated in a forward direction on the first pivot, and the third panel may be rotated in the forward direction on the second pivot. The first, second, third and fourth panels may be configured to extend the box by being positioned in an extended position with the first panel rotated in a rearward direction on the first pivot and the second panel positioned at an angle to the first panel, and with the third panel rotated in the rearward direction on the second pivot and the fourth panel positioned at an angle to the third panel.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

A pickup box may typically include four walls extending upward around a bed. The forward wall may typically be positioned behind the cab of the pickup. Two side walls may extend along the inside of the outer styled sheet metal and can include a wheel well arch that extends into the box on each side. The fourth or rear wall of the box may typically be an endgate or tailgate that together with the forward wall and the two side walls define a volume. The tailgate may be hinged to swing out and down to a supported open position generally level with the bed so that the tailgate extends the longitudinal length of the bed whereby the area encompassed by the combined flat surface is increased over that provided by the bed alone. However, when open, the volume above the tailgate is no longer enclosed on its sides and rear. Therefore, a number of variations may include a pickup box extender as illustrated in FIGS. 1 through 7.

Figure 1:
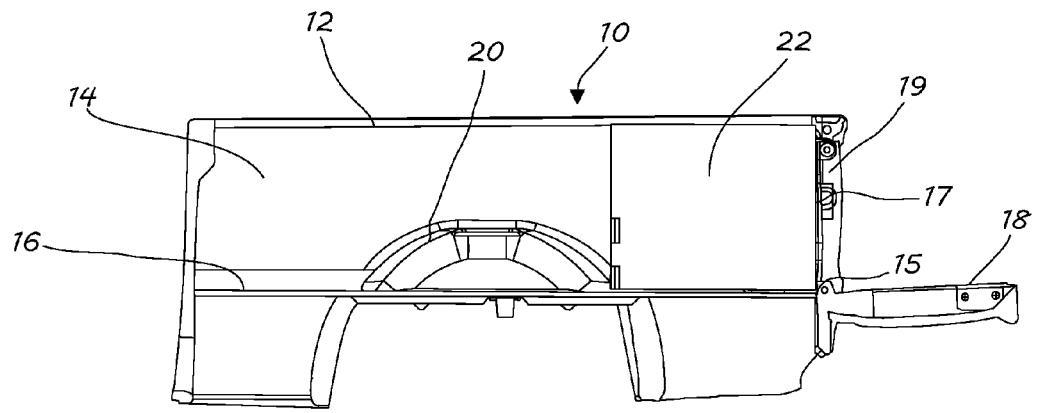
FIG. 1 is a fragmentary side view schematic illustration through a pickup's bed, showing a box extender arrangement according to a number of variations.

Referring to FIG. 1, a sectioned view of the bed area of a pickup 10 is illustrated. The pickup 10 may include a box 12 with a side wall 14 that extends upward from, and along the length of, a bed 16. At the rearward end 15 of the bed 16 a tailgate 18 is shown in an opened position extending rearward beyond the side wall 14 and presenting a generally flat longitudinal extension level with the bed 16. The side wall 14 may include an arch 20 of a wheel well that may extend along part of the length of the side wall and into the bed area of the box. A box extender 22 may be attached to the box 12 and may be located in a stowed position as illustrated. When stowed, the box extender 22 may be positioned adjacent the side wall 14 between the wheel well arch 20 and the rearward end 17 of the side wall 14 forward of the opening 19 that is filled with the tailgate 18 when closed.

Figure 2:
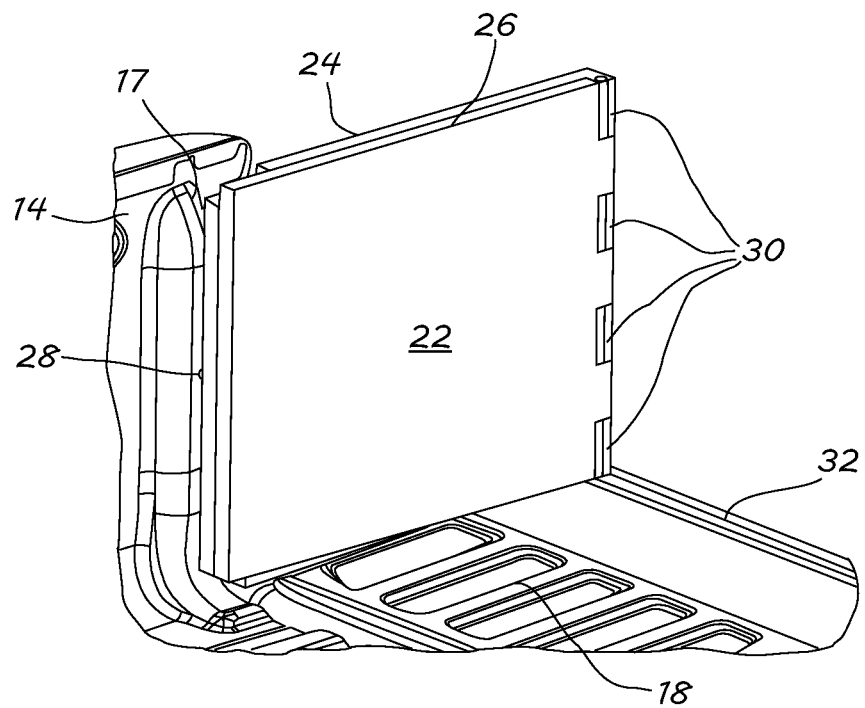
FIG. 2 is a fragmentary isometric view schematic illustration of a box extender arrangement according to a number of variations.
Figure 3:
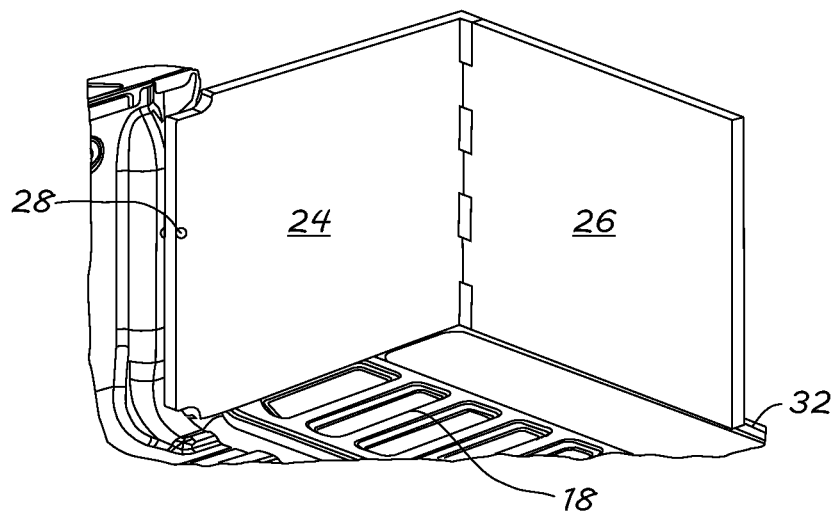
FIG. 3 is a fragmentary isometric view schematic illustration of a box extender arrangement according to a number of variations.

As more readily seen in FIG. 2, the box extender 22 may be configured as two panels 24 and 26. The first panel 24 may include a pivot 28 connected to the side wall 14, or may include a slide or other mechanism to permit translation from the stowed position shown in FIG. 1 to the deployed or extended position shown in FIG. 2. The pivot 28 may be located approximately at a midpoint of the height of the panel 24. In the extended position of FIG. 2, the panel 24 has been rotated upward and rearward off of the bed 16 and out onto the tailgate 18 so that it may be disposed above and near the edge of the tailgate behind the rearward end 17 of the side wall 14. The second panel 26 may be connected to the first panel 24 such as by a hinged edge 30, or may be connected to the tailgate 18 such as along the rearward edge 32 and may fold upward therefrom. It will be appreciated that a second set of panels may be positioned on the opposite side wall of the box 12 to provide a complete enclosure around the tailgate 18. As shown in FIG. 3, the panel 26 may be rotated about the hinged edge 30 away from the panel 24 to a deployed position on tailgate 18, near the rearward edge 32. The two forward facing corners of the panel 24 as shown in FIG. 3 may be scalloped or otherwise formed or cut away to facilitate rotation about the pivot 28 without interference. Once the box extender 22 is deployed to the extended position, access to the box 12 may be accomplished by translating the panel 24 or by swinging the panel 26 to provide an opening. Latches may be provided where convenient to secure the panels to the tailgate 18 or to each other.

Figure 4:
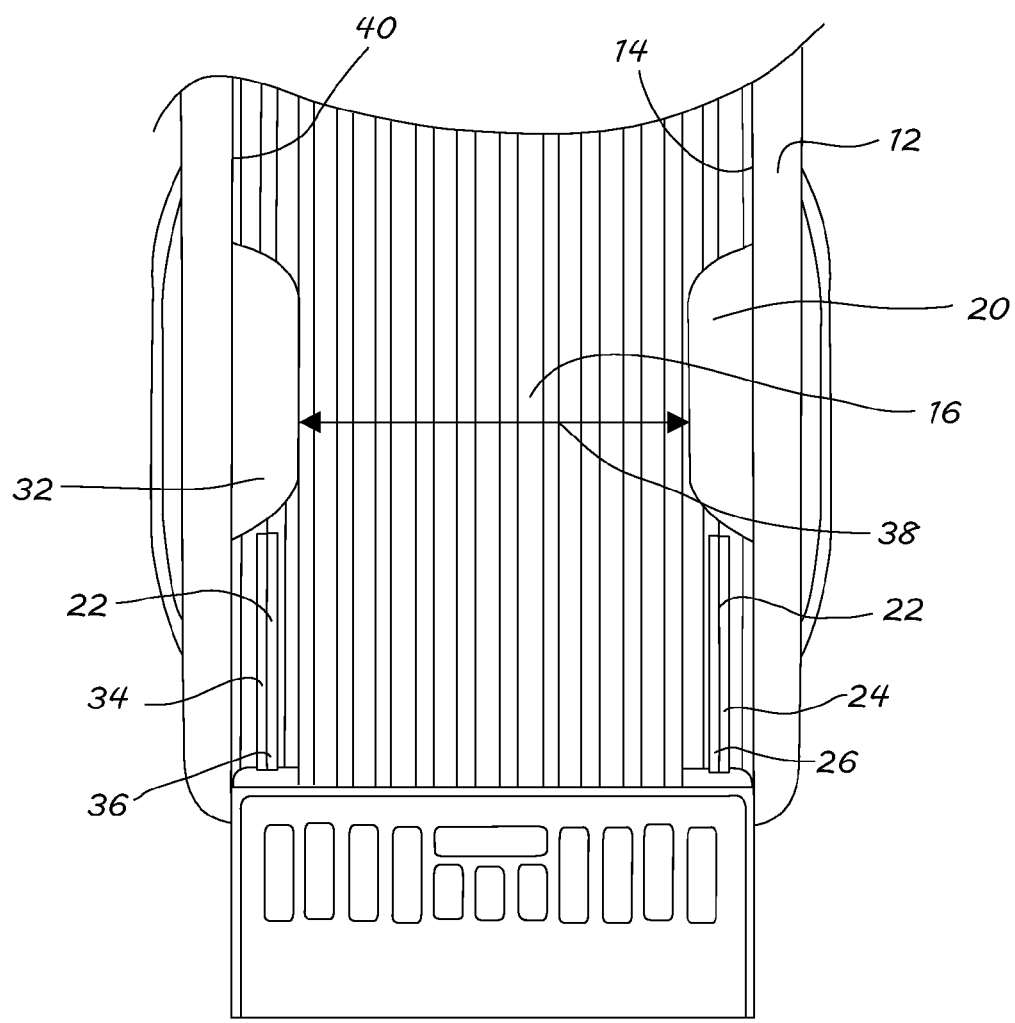
FIG. 4 is a fragmentary plan view schematic illustration of a box extender arrangement according to a number of variations.

As shown in FIG. 4, the box extender 22 may include two components one of which may be made up of the panels 24 and 26 and another of which may be made up of the panels 34 and 36 on opposite sides of the bed 16. In the stowed position shown, the panels 24 and 26 are stationed near the side wall 14 in a space behind the wheel well arch 20, and the panels 34 and 36 are in a space behind the wheel well arch 32 near the side wall 40. Each set of panels is disposed laterally outside the open area 38 defined between the wheel well arches 20, 32. As a result, the box extender 22 stores in a way that does not significantly intrude on the on the cargo area of box 12.

Figure 5:
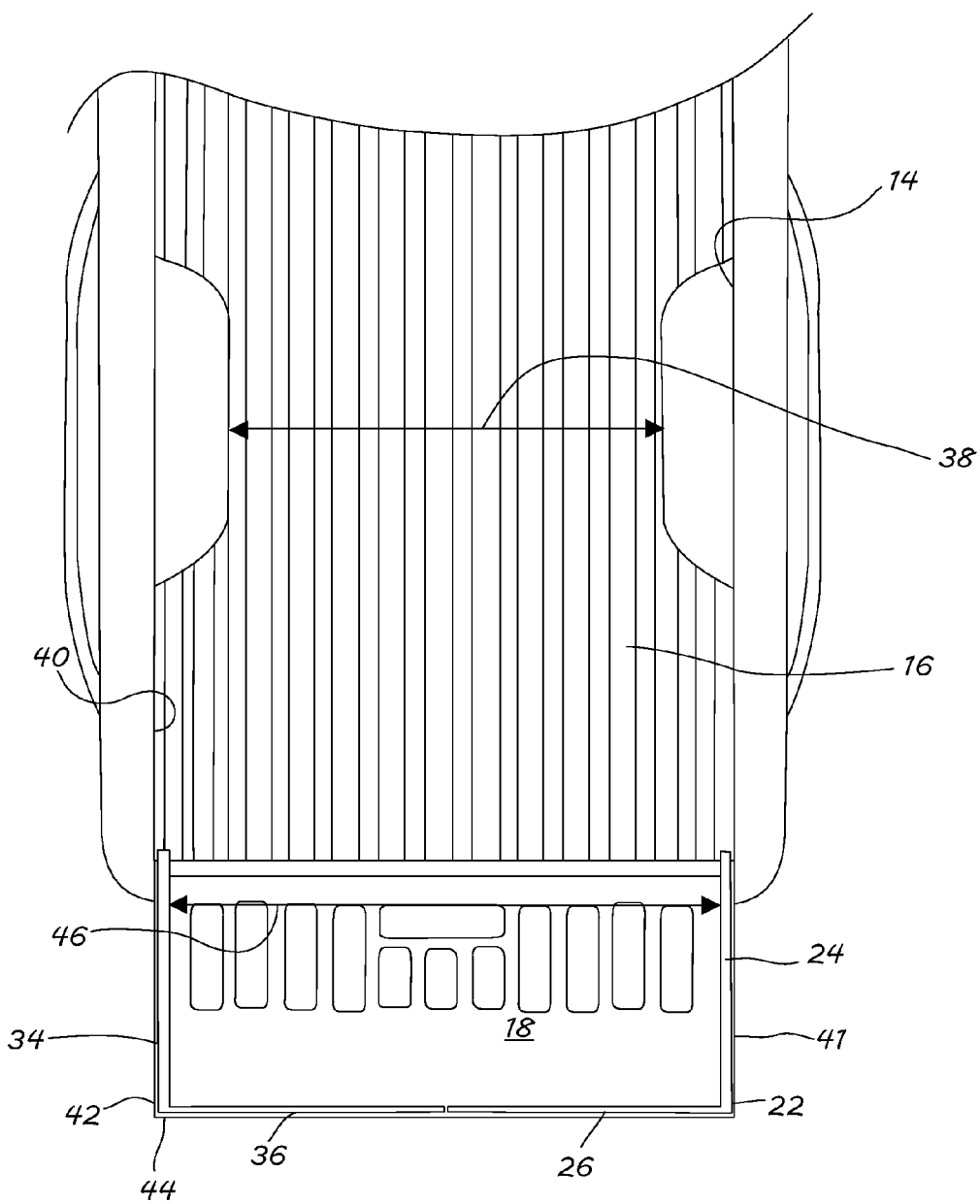
FIG. 5 is a fragmentary plan view schematic illustration of a box extender arrangement according to a number of variations.

When deployed to the extended position shown in FIG. 5, the box extender 22 may encompass the majority of the area defined by the tailgate 18. The panel 24 extends rearward from the side wall 14, near the edge 41 of the tailgate 18 and the panel 34 extends rearward from the side wall 40, near the edge 42 of the tailgate 18. Between the panels 24 and 34 the panels 26 and 36 extend along the rearward edge 44 of the tailgate 18 so that the open area 46 may be wider than the open area 38 between the wheel well arches. The extended enclosed area extends all the way to the end wall that is made up of the panels 26 and 36.

Figure 6:
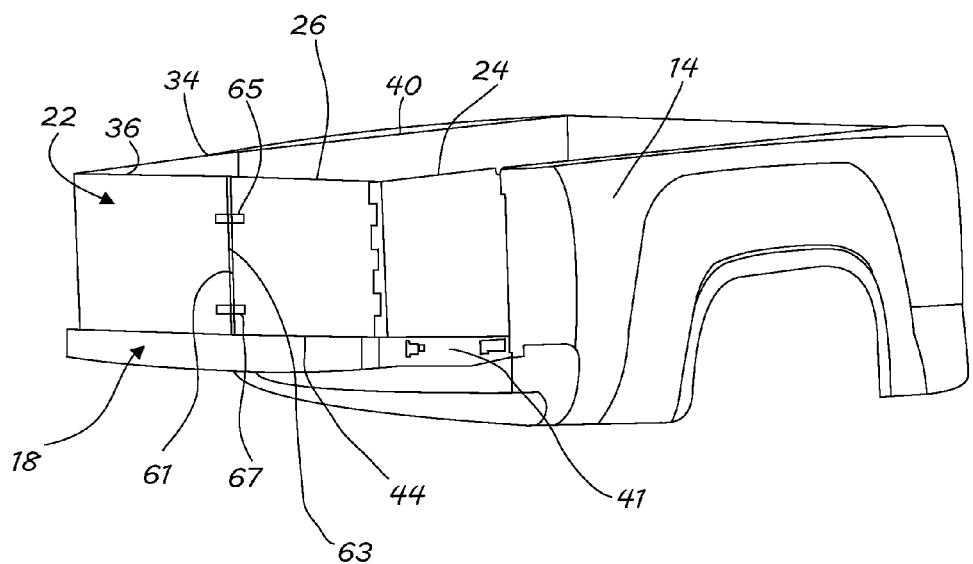
FIG. 6 is a fragmentary isometric view schematic illustration of a box extender arrangement according to a number of variations.

FIG. 6 shows another perspective on the extended position of the box extender 22. The panel 24 extends rearward from the side wall 14, near the edge 41 of tailgate 18, and the panel 34 extends rearward from the side wall 40, near the opposite edge (from the edge 41), of tailgate 18. Between the panels 24 and 34 the panels 26 and 36 extend along the rearward edge 44 of the tailgate 18, with their edges 61, 63 mating near the center of the tailgate 18. The panels may include latches 65, 67 for securing the edges 61, 63 and locking the panels in position.

Figure 7:
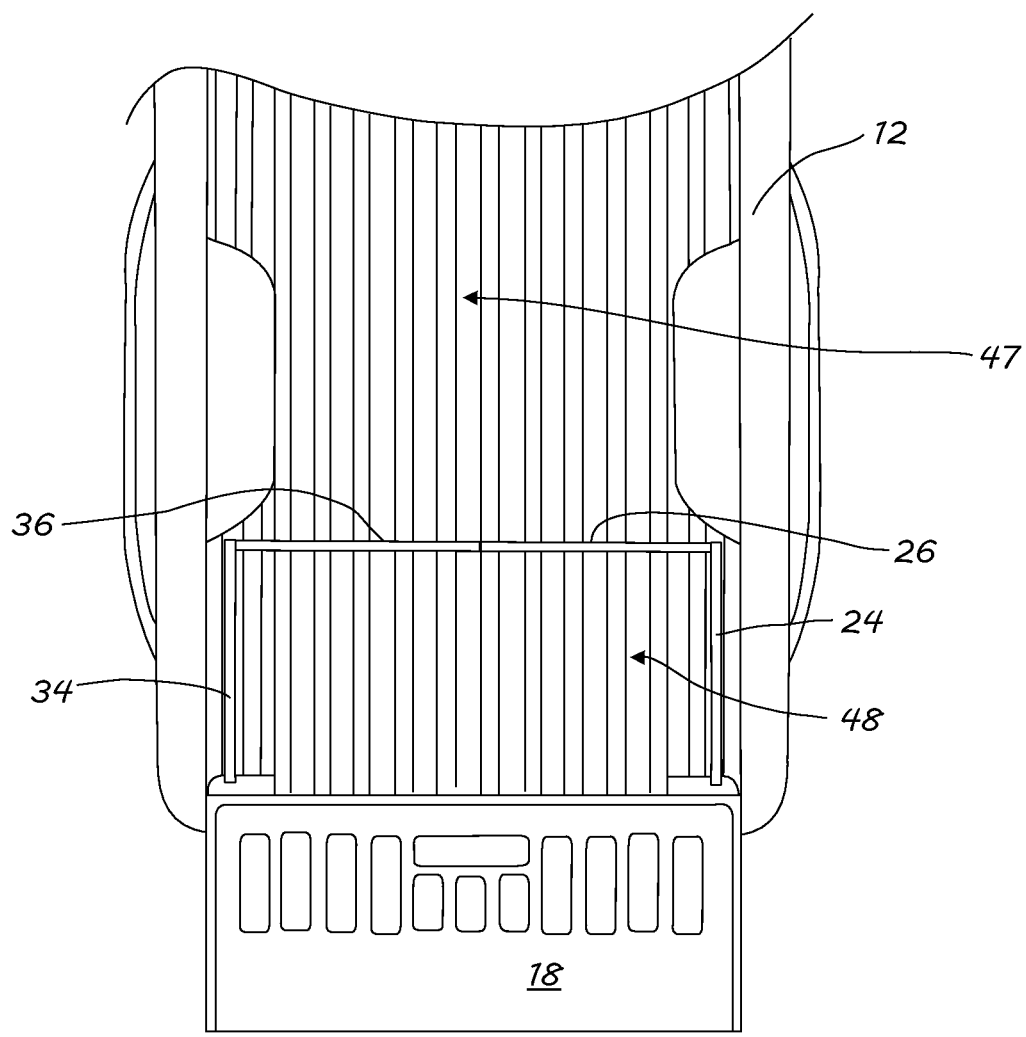
FIG. 7 is a fragmentary plan view schematic illustration of a box extender arrangement according to a number of variations.

Referring to FIG. 7, the box extender 22 is shown deployed to segregate the box 12 into a forward space 47 and a rearward space 48. The panels 24 and 34 may remain positioned in the stored position. The panels 26 and 36 may be rotated forward to divide the space within the box and may be locked in position. This may provide a convenient way of ensuring that articles placed in the rearward space 48 remain within reach when the tailgate 18 is open, or may provide other advantageous options for cargo management.

The following variants are only illustrative of components, elements, acts, products and methods considered to be within the scope of the invention and are not in any way intended to limit such scope by what is specifically disclosed or not expressly set forth. Components, elements, acts, products and methods may be combined and rearranged other than as expressly described herein and still are considered to be within the scope of the invention.

Variation 1 may include a box extender for a pickup truck having a cargo box defined by opposing longitudinal walls and a lateral wall, with an opening defined between the longitudinal walls opposite the lateral wall. The box extender may include a first side wall mounted to the box adjacent to one of the opposing longitudinal walls and a second side wall mounted to the box adjacent to the other of the opposing longitudinal walls. The first and second side walls may be configured to translate between a forward position adjacent the opposite longitudinal walls, and a rearward position extending rearward beyond the longitudinal walls. An end wall may be extendable between the first and second side walls wherein at least a portion of the first side wall, the second side wall, and the end wall may be opened to access the box.

Variation 2 may include a product for extending the cargo area of a box of a pickup truck. A first panel may have a first edge and a second edge. The first and second edges may be on opposite ends of the first panel. The first edge may be pivotably attached to the box. A second panel may be connected to the second edge. The first and second panels may be configured to be oriented inside of the box adjacent a wall of the box in a stored position with the second panel positioned against the first panel. The first and second panels may be configured to extend the box when positioned in an extended position outside of the box with the first panel rotated in a rearward direction on the pivot and the second panel rotated on the hinge so that the second panel is positioned at an angle to the first panel.

Variation 3 may include a product according to variation 2 wherein the second panel is rotatable on the hinge to an open position when the first panel is in the extended position, to access the box from a rearward side.

Variation 4 may include a product according to variation 2 or 3 wherein the second panel is rotatable on the hinge when the first panel is in the stored position to divide the box into two separated volumes.

Variation 5 may include a product according to any of variations 2 through 4 wherein the first panel has a height and wherein the pivot is positioned approximately at a midpoint of the height.

Variation 6 may include a product according to any of variations 2 through 5 and may include a third panel having a pivot attached to the box, and a fourth panel hinged on the third panel.

Variation 7 may include a product according to variation 6 wherein the box includes a first side and a second side that is opposite the first side and wherein the first panel is attached to the first side and the third panel is attached to the second side.

Variation 8 may include a product according to variation 6 or 7 wherein the pickup truck includes a bed and a tailgate that when open defines an extended rearward edge of the bed, and wherein the second panel and the fourth panel extend along the rearward edge when in the extended position.

Variation 9 may include a product according to variation 8 wherein the tailgate includes two side edges and wherein the first and third panels each extend along one of the side edges when in the extended position.

Variation 10 may include a product according to any of variations 2 through 9 wherein a wheel well arch extends into the box and wherein the first and second panels are positioned in the box rearward from the wheel well arch when in the stored position.

Variation 11 may include a product according to any of variations 2 through 10 wherein the pickup truck includes a tailgate that may be opened and wherein when in the extended position the first and second panels rest on the tailgate.

Variation 12 may include an extender for a pickup having a cargo box with a first side and an opposite second side. The extender may include a first panel. A first pivot may attach the first panel to the first side of the box. A second panel may be hinged on the first panel. A third panel may include a second pivot attaching the third panel to the second side of the box. A fourth panel may be hinged on the third panel. The first, second, third and fourth panels may be configured to be stored adjacent the first and second sides of the box in a stored position. In the stored position the second panel may be rotated against the first panel, the fourth panel may be rotated against the third panel, the first panel may be rotated in a forward direction on the first pivot, and the third panel may be rotated in the forward direction on the second pivot. The first, second, third and fourth panels may be configured to extend the box by being positioned in an extended position with the first panel rotated in a rearward direction on the first pivot and the second panel positioned at an angle to the first panel, and with the third panel rotated in the rearward direction on the second pivot and the fourth panel positioned at an angle to the third panel.

Variation 13 may include an extender according to variation 12 wherein the second and fourth panels may be rotatable on their hinges to an open position when the first and third panels are in the extended position, to access the box from a rearward side.

Variation 14 may include an extender according to variation 12 or 13 wherein the second and fourth panels may be rotatable on their hinges when the first and third panels are in the stored position to divide the box into two separated volumes.

Variation 15 may include an extender according to any of variations 12 through 14 wherein the first and third panels have a height and wherein the pivots may be positioned approximately at a midpoint of the height.

Variation 16 may include an extender according to any of variations 12 through 15 wherein the first and third panels each have at least one scalloped corner to facilitate rotation.

Variation 17 may include an extender according to any of variations 12 through 16 wherein the pickup may include a bed and a tailgate that when open defines an extended rearward edge of the bed, and wherein the second panel and the fourth panel may extend along the rearward edge when in the extended position.

Variation 18 may include an extender according to variation 17 wherein the tailgate may include two side edges and wherein the first and third panels may each extend along one of the side edges when in the extended position.

Variation 19 may include an extender according to any of variations 12 through 18 wherein first and second wheel well arches may extend into the box. The first and second panels may be positioned in the box rearward from the first wheel well arch when in the stored position and the third and fourth panels may be positioned in the box rearward from the second wheel well arch when in the stored position.

Variation 20 may include an extender according to any of variations 12 through 19 wherein the pickup may include a tailgate that may be opened and wherein when in the extended position the first, second, third and fourth panels rest on the tailgate.

The above description of select variations within the scope of the invention is merely illustrative in nature and, thus, variations or variants thereof are not to be regarded as a departure from the spirit and scope of the invention.

What is claimed is:

1. A box extender for a pickup truck having a cargo box defined by opposing longitudinal walls and a lateral wall, with an opening defined between the longitudinal walls opposite the lateral wall, the box extender comprising: a first side wall mounted to the box adjacent to one of the opposing longitudinal walls and a second side wall mounted to the box adjacent to the other of the opposing longitudinal walls, the first and second side walls being configured to translate between a forward position each adjacent one of the opposite longitudinal walls, and a rearward position extending rearward beyond the longitudinal walls; and an end wall extendable between the first and second side walls wherein at least a portion of the first side wall, the second side wall, and the end wall may be opened to access the box, wherein when in the rearward position, the first panel has a pair of forward facing corners that are scalloped, in-that they are each formed such that they are cut away in an internal projecting scallop shape, to facilitate rotation of the first panel about the pivot without interference.

2. A product for extending the cargo area of a box defined around a bed of a pickup truck the product comprising: a tailgate closing the box and openable to define an extended rearward edge of the bed, and a first panel having a first edge and a second edge the first and second edges on opposite ends of the first panel, the first edge pivotably attached to the box by a pivot; and a second panel connected to the second edge by a hinge; wherein the first and second panels are configured to be oriented inside of the box adjacent a wall of the box in a stored position with the second panel positioned against the first panel, and wherein the first and second panels are configured to extend the box when positioned in an extended position outside of the box with the first panel rotated in a rearward direction on the pivot and the second panel rotated on the hinge so that the second panel is positioned at an angle to the first panel; wherein the tailgate includes two side edges and wherein the first panel extends along one of the side edges when the tailgate is opened and the first panel is in the extended position.

3. The product according to claim 2 wherein the second panel is rotatable on the hinge to an open position when the first panel is in the extended position, to access the box from a rearward side.

4. The product according to claim 2 wherein the second panel is rotatable on the hinge when the first panel is in the stored position to divide the box into two separated volumes.

5. The product according to claim 2 wherein the first panel has a height with a midpoint, and wherein the pivot is positioned approximately at the midpoint.

6. The product according to claim 2 further comprising a third panel pivotably attached to the box; and a fourth panel connected to the third panel.

7. The product according to claim 6 wherein the box includes a first side and a second side that is opposite the first side and wherein the first panel is attached to the first side and the third panel is attached to the second side.

8. The product according to claim 6 wherein the tailgate defines an extended rearward edge of the bed when opened, and wherein the second panel and the fourth panel extend along the rearward edge when the second and fourth panels are in the extended position.

9. A product for extending the cargo area of a box of a pickup truck the product comprising: a first panel having a first edge and a second edge the first and second edges on opposite ends of the first panel, the first edge pivotably attached to the box by a pivot; and a second panel connected to the second edge by a hinge; wherein the first and second panels are configured to be oriented inside of the box adjacent a wall of the box in a stored position with the second panel positioned against the first panel, and wherein the first and second panels are configured to extend the box when positioned in an extended position outside of the box with the first panel rotated in a rearward direction on the pivot and the second panel rotated on the hinge so that the second panel is positioned at an angle to the first panel; and further comprising a third panel pivotably attached to the box; and a fourth panel connected to the third panel; wherein the pickup truck includes a bed and a tailgate that when open defines an extended rearward edge of the bed, and wherein the second panel and the fourth panel extend along the rearward edge when the second and fourth panels are in the extended position; wherein the tailgate includes two side edges and wherein the first and third panels each extend along one of the side edges when the first and third panels are in the extended position.

10. The product according to claim 2 wherein a wheel well arch extends into the box and wherein the first and second panels are positioned in the box rearward from the wheel well arch when the first and second panels are in the stored position.

11. The product according to claim 2 wherein when the first and second panels are in the extended position, the first and second panels rest on the tailgate.

12. An extender for a pickup having a cargo box with a first side and an opposite second side an openable tailgate extending between the first and second sides, the extender comprising: a first panel; a first pivot attaching the first panel to the first side of the box and around which the first and second panels are pivotable while they remain disposed parallel with the second side; a second panel hinged on the first panel; a third panel; a second pivot attaching the third panel to the second side of the box on which the third and fourth panels are pivotable while they remain parallel with the second side; and a fourth panel hinged on the third panel; wherein the first, second, third and fourth panels are configured to be stored adjacent the first and second sides of the box in a stored position with the second panel rotated against the first panel, the fourth panel rotated against the third panel, the first panel rotated in a forward direction on the first pivot, and the third panel rotated in the forward direction on the second pivot; wherein the first, second, third and fourth panels are configured to extend the box by being positioned in an extended position with the first panel rotated in a rearward direction on the first pivot and the second panel positioned at an angle to the first panel, and with the third panel rotated in the rearward direction on the second pivot and the fourth panel positioned at an angle to the third panel, wherein the tailgate includes two side edges and wherein the first and third panels each extend along one of the side edges when the first and third panels are in the extended position.

13. The extender according to claim 12 wherein the second and fourth panels are rotatable to an open position when the first and third panels are in the extended position, to access the box from a rearward side.

14. The extender according to claim 12 wherein the second and fourth panels are rotatable when the first and third panels are in the stored position to divide the box into two separated volumes.

15. The extender according to claim 12 wherein the first and third panels have a height and wherein each of the first and second pivots are positioned approximately at a midpoint of the height.

16. The extender according to claim 12 wherein the first and third panels each have at least one scalloped corner to facilitate rotation.

17. The extender according to claim 12 wherein the pickup includes a bed, wheel wells extending into the box from each of the first and second sides and spaced apart a distance by an open area between the wheel wells, and the tailgate when open defines an extended rearward edge of the bed, and wherein the second panel and the fourth panel each extends along the rearward edge when the second and fourth panels are in the extended position, and the first and third panels, in entirety, are located further apart than the distance.

18. The extender according to claim 12 wherein when in the extended position, the first and third panel each has a pair of forward facing corners that are scalloped, in-that they are each formed such that they are cut away in an internal projecting scallop shape to facilitate rotation of the first and third panels about their respective pivot without interference.

19. The extender according to claim 12 wherein first and second wheel well arches extend into the box and wherein the first and second panels are positioned in the box rearward from the first wheel well arch when the first and second panels are in the stored position, and the third and fourth panels are positioned in the box rearward from the second wheel well arch when the third and fourth panels are in the stored position.

20. The extender according to claim 12 wherein when in the extended position the first, second, third and fourth panels rest on the tailgate.

21. The extender according to claim 12 wherein the first and third panels remain positioned in the stored position while the second and fourth panels are rotated forward and placed onto the bed into a deployed position dividing the box into separate spaces.

* * * * *